United States Patent
Sultenfuss et al.

(10) Patent No.: US 9,037,877 B2
(45) Date of Patent: May 19, 2015

(54) SYSTEM AND METHOD FOR OPERATING A PLURALITY OF COMPONENTS ACCORDING TO FIRST OR SECOND OPERATING CHARACTERISTICS IN RESPONSE TO A DETECTED FIRST OR SECOND POWER INPUT CHARACTERISTIC ASSOCIATED WITH A FIRST OR SECOND POWER INPUT RESPECTIVELY

(75) Inventors: Andrew Thomas Sultenfuss, Leander, TX (US); William Sauber, Georgetown, TX (US)

(73) Assignee: Dell Products L.P., Round Rock, TX (US)

(*) Notice: Subject to any disclaimer, the term of this patent is extended or adjusted under 35 U.S.C. 154(b) by 463 days.

(21) Appl. No.: 13/355,286

(22) Filed: Jan. 20, 2012

(65) Prior Publication Data

US 2013/0191674 A1    Jul. 25, 2013

(51) Int. Cl.
*G06F 1/00* (2006.01)
*G06F 1/32* (2006.01)

(52) U.S. Cl.
CPC .................................. *G06F 1/3206* (2013.01)

(58) Field of Classification Search
CPC .............. G06F 1/263; G06F 1/28; H02J 1/10
USPC .............................. 713/300, 320, 340; 307/43
See application file for complete search history.

(56) References Cited

U.S. PATENT DOCUMENTS

| | | | | |
|---|---|---|---|---|
| 4,233,553 A * | 11/1980 | Prince et al. | ................... | 320/146 |
| 5,570,002 A * | 10/1996 | Castleman | ................... | 323/283 |
| 5,842,027 A * | 11/1998 | Oprescu et al. | ............... | 713/300 |
| 6,097,175 A * | 8/2000 | Yoon | ............................. | 320/132 |
| 6,357,011 B2 * | 3/2002 | Gilbert | ......................... | 713/300 |
| 6,700,808 B2 * | 3/2004 | MacDonald et al. | ......... | 363/142 |
| 6,791,853 B2 * | 9/2004 | Afzal et al. | ................... | 363/142 |
| 7,293,187 B2 * | 11/2007 | Ono | ............................. | 713/324 |
| 7,441,127 B2 * | 10/2008 | Sugasawa | ..................... | 713/300 |
| 7,603,571 B2 | 10/2009 | Sauber | | |
| 7,877,618 B2 | 1/2011 | Lewis et al. | | |
| 8,313,209 B2 * | 11/2012 | Connor et al. | ................ | 362/183 |
| 2004/0075419 A1 * | 4/2004 | Massey et al. | ................ | 320/117 |
| 2005/0246557 A1 * | 11/2005 | Vanzante | ....................... | 713/300 |
| 2007/0234087 A1 * | 10/2007 | Cromer et al. | ................ | 713/310 |
| 2013/0179697 A1 * | 7/2013 | Nicholas et al. | .............. | 713/300 |
| 2013/0320769 A1 * | 12/2013 | Sawyers | ......................... | 307/80 |

* cited by examiner

*Primary Examiner* — Mark Connolly
(74) *Attorney, Agent, or Firm* — Haynes and Boone, LLP (57) ABSTRACT

A power input utilization system includes a plurality of components and a plurality of power input connectors. A power utilization engine is coupled between the plurality of power input connectors and the plurality of components. The detect a power input to the plurality of power input connectors and determine a power input characteristic for the power input. The power utilization engine is also operable to use the power input characteristic to determine a plurality of operation characteristics for the plurality of components. The power utilization engine is also operable to operate the plurality of components using on the power input and the plurality of operation characteristics.

20 Claims, 8 Drawing Sheets

SYSTEM AND METHOD FOR OPERATING A PLURALITY OF COMPONENTS ACCORDING TO FIRST OR SECOND OPERATING CHARACTERISTICS IN RESPONSE TO A DETECTED FIRST OR SECOND POWER INPUT CHARACTERISTIC ASSOCIATED WITH A FIRST OR SECOND POWER INPUT RESPECTIVELY

BACKGROUND

The present disclosure relates generally to information handling systems (IHSs), and more particularly to power input utilization systems for an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The conversion and/or utilization of power inputs by IHSs and, particularly, mobile/portable IHSs, is typically dictated by narrow or limited capabilities of the power inputs (e.g., the power source, the power adapter, etc.) Conventional power inputs may be numerous, and include IHS docks, automobiles, airliners, direct current (DC) adapters, universal serial bus (USB) power sources, wireless power sources, solar power sources, fuel cell power sources, and/or a variety of other power inputs known in the art. Currently IHS do not have the ability to utilize these numerous and widely differing power inputs in an efficient and consistent manner.

Accordingly, it would be desirable to provide an improved power utilization system.

SUMMARY

According to one embodiment, a power input utilization system includes a plurality of components, a plurality of power input connectors, and a power utilization engine that is coupled between the plurality of power input connectors and the plurality of components, wherein the power utilization engine is operable to detect power inputs to the plurality of power input connectors, select one or more of the detected power inputs, determine a power input characteristic for the power input(s), determine a plurality of operation characteristics for the plurality of components, wherein the plurality of operation characteristics are determined using the power input characteristic, and operate the plurality of components using the power input(s) and the plurality of operation characteristics.

BRIEF DESCRIPTION OF THE DRAWINGS

FIG. 4b is a flow chart illustrating an embodiment of performing operation control in the method for power utilization of FIG. 4a.

FIG. 4c is a flow chart illustrating an embodiment of performing charge control in the method for power utilization of FIG. 4a.

FIG. 4d is a flow chart illustrating an embodiment of monitoring charge and operation in the method for power utilization of FIG. 4a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
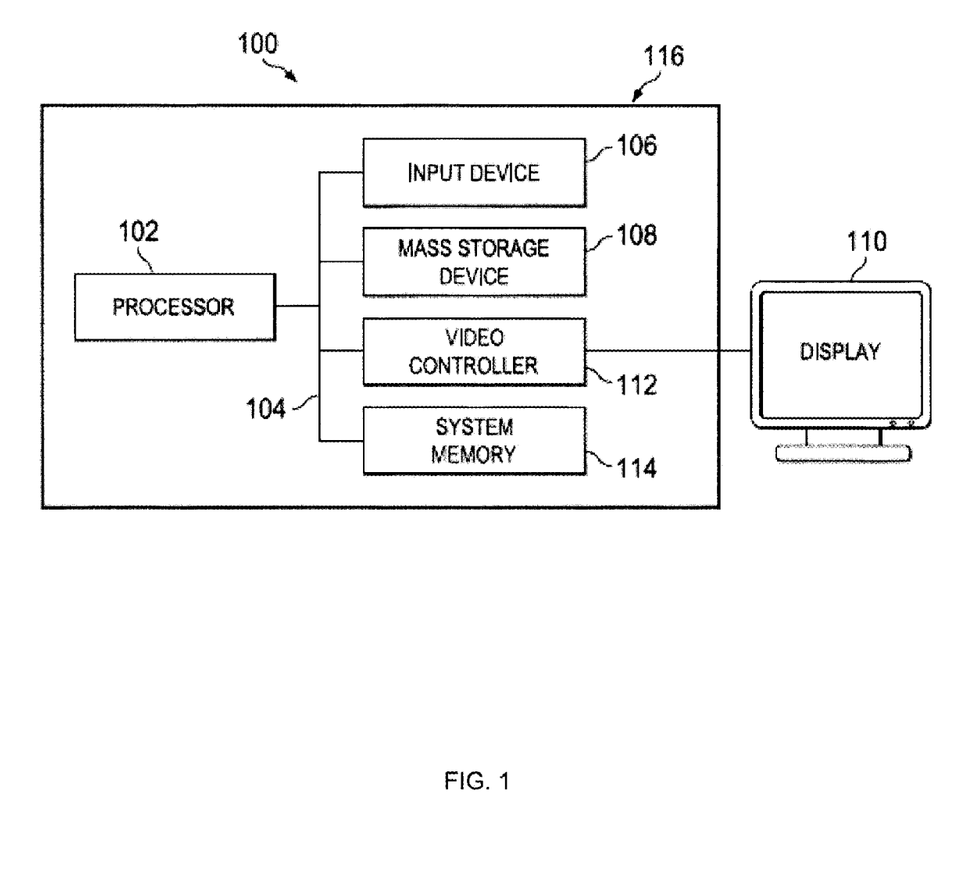
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
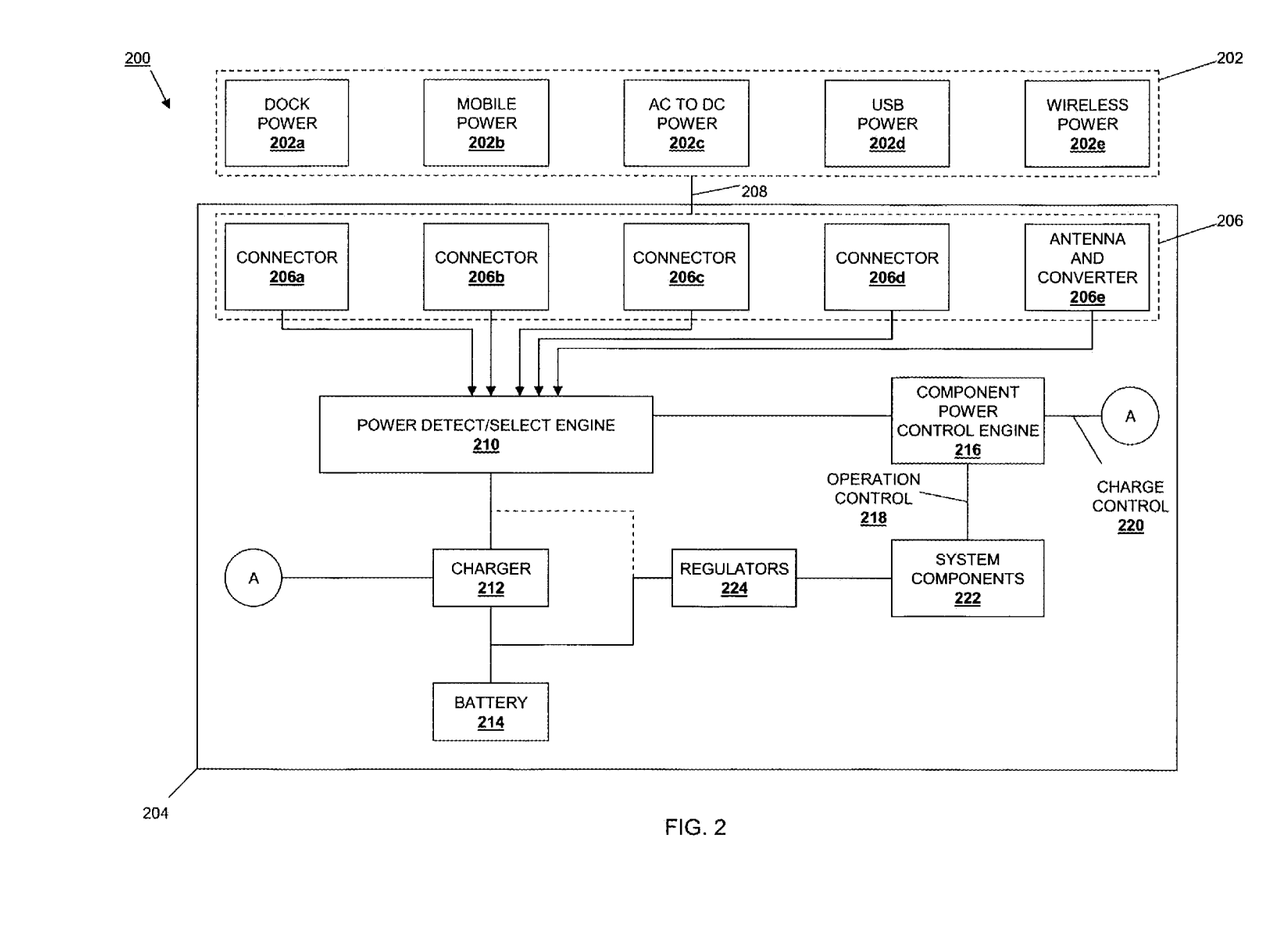
FIG. 2 is a schematic view illustrating an embodiment of an power input utilization system.

Referring now to FIG. 2, a power input utilization system 200 is illustrated. The power input utilization system includes a plurality of power inputs 202 such as, for example, a dock power input 202a, a mobile power input 202b, an alternating current (AC) to direct current (DC) power input 202c, a universal serial bus (USB) power input 202d, a wireless power input 202e, and/or a variety of other power inputs known in the art. For example, the dock power input 202a in the illustrated embodiment may include a power input that is operable to provide power to a mobile/portable IHS through a docking station that connects the mobile/portable IHS to a plurality of peripheral devices such as, for example, a keyboard, a mouse, a display device, and/or a variety of other peripheral devices known in the art. In another example, the mobile power input 202b in the illustrated embodiment may include a power input that is operable to provide power to an IHS from an automobile (e.g., through a conventional 12 volt auxiliary power outlet (previously used for cigarette lighters) in the automobile), an airplane, and/or a variety of other mobile power sources known in the art. In another example, the AC to DC power input 202c in the illustrated embodiment may include a power input that is operable to convert power from an AC power source in order to provide a DC power input to an IHS (e.g., a conventional power adapter). In another example, the USB power input 202d in the illustrated embodiment may include a power input that is operable to provide power to a first IHS from an IHS battery in a second IHS through a USB connector on the second IHS. In another example, the wireless power input 202e in the illustrated embodiment may include a power input that is operable to provide power wirelessly to an IHS. While a plurality of power inputs have been described above, one of skill in the art will recognize that any power input may fall within the scope of the present disclosure. Furthermore, one of skill in the art will recognize that the power inputs 202a, 202b, 202c, 202d, and 202e may each provide power having a wide variety of voltages, currents, and/or other power characteristics relative to the other power inputs.

The power input utilization system 200 also includes an IHS 204. In an embodiment, the IHS 204 may be the IHS 100, discussed above with reference to FIG. 1, and may include some or all of the IHS components discussed above including the chassis 116, the processor 102, the mass storage device 108, the system memory 114, other non-transitory computer-readable mediums, and/or a variety of other IHS components known in the art. The IHS 204 includes a plurality of power input connectors 206. For example, a connector 206a may be operable to connect the IHS 204 to the dock power input 202a, a connector 206b may be operable to connect the IHS 204 to the mobile power input 202b, a connector 206c may be operable to connect the IHS 204 to the AC to DC power input 202c, a connector 206d may be operable to connect the IHS 204 to the USB power input 202d, and an antenna and converter 206e may be operable to connect the IHS 204 to the wireless power input 202e. In the illustrated embodiment in FIG. 2, a connection 208 is illustrated as providing the connection between the power inputs 202a-e and the power input connectors 206a-e, and one of skill in the art should recognize that the connection 208 is meant to illustrate a connection between any number of the power inputs 202a-e and their respective power input connectors 206a-e (e.g., the IHS 204 may be connected to one or more of the power inputs 202a-e through the power input connectors 206a-e at a given time.)

Each of the power input connectors 206a-e is coupled to a power detect/select engine 210. In an embodiment, the power detect/select engine 210 may include analog circuits to detect and enable a power source. Instructions may be stored on a non-transitory computer-readable medium and, when executed by a processor, may cause the processor to perform additional functions of the power detect/select engine discussed below. The power detect/select engine 210 is coupled to a charger 212 that is coupled to a battery 214. The power detect/select engine 210 is also coupled to a component power control engine 216. In an embodiment, the component power control engine 216 includes instructions, stored on a non-transitory computer-readable medium, that when executed by a processor cause the processor to perform the functions of the component power control engine 216 discussed below. In an embodiment, the power detect/select engine 210 and the component power control engine 216 provide a power utilization engine that provides operation control 218 of components in the IHS 204 and/or charge control 220 of the battery 214, as discussed in further detail below. The component power control engine 216 is coupled to the charger 212 and one or more system components 222 in the IHS 204. In an embodiment, the one or more system components 222 may include processors, memory modules, storage drives, communication devices and/or a variety of other system components known in the art. In an embodiment, power control of system components other than the charger 212 may be implemented in the system host processor using information from the component power control engine 216. Using the information that is implicitly or explicitly provided in response to the selection of the power source, discussed in detail below, one of skill in the art will recognize how the operation control of the system components 222 and/or charge control of the battery 214 may be implemented. One or more regulators 224 provide power to the one or more system components 222. The regulators 224 may receive input power from the battery 214 and optionally the power detect/select engine 210.

Figure 3:
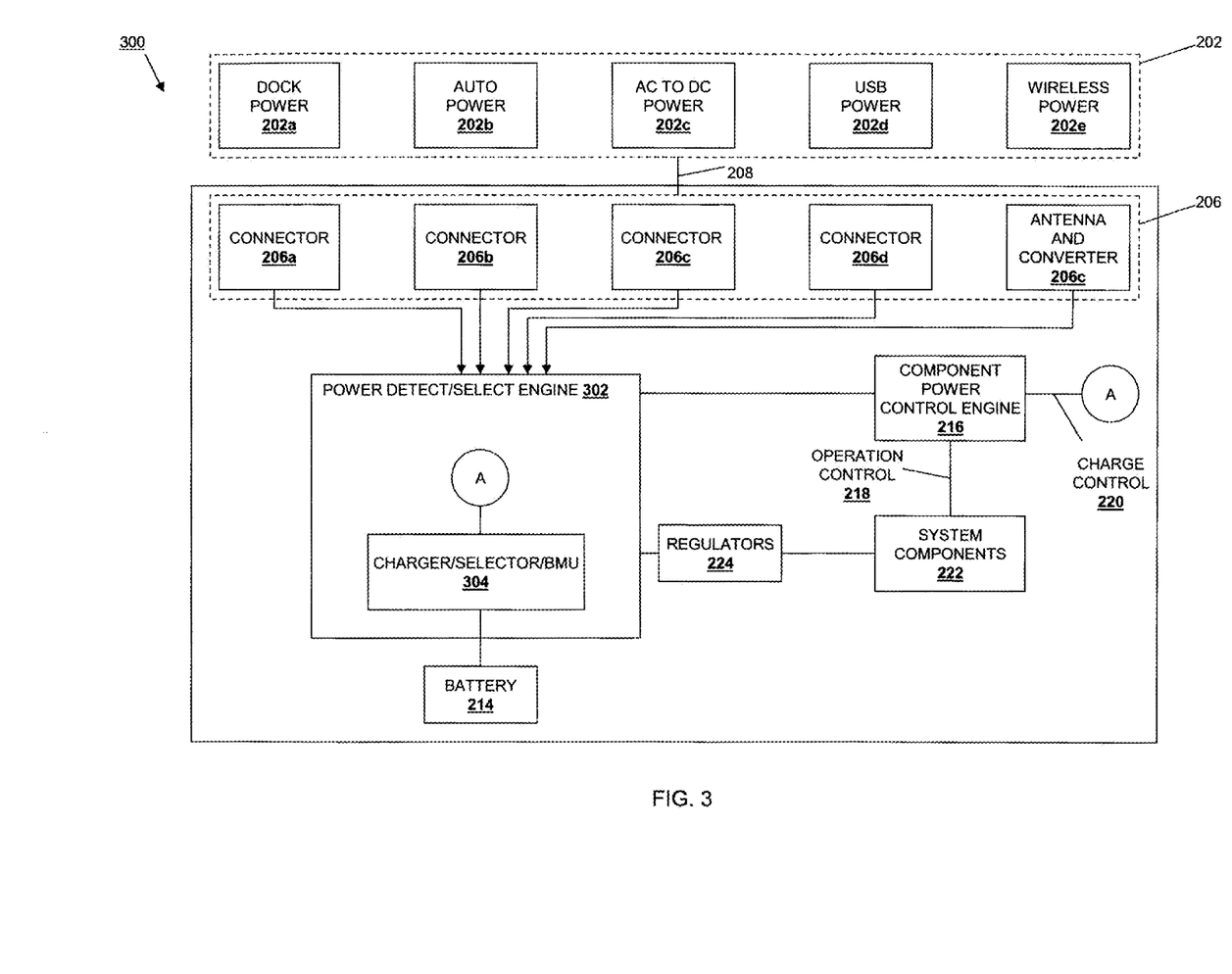
FIG. 3 is a schematic view illustrating an embodiment of an power input utilization system.

Referring now to FIG. 3, a power input utilization system 300 is illustrated that is substantially similar in structure and operation to the power utilization system 200, discussed above with reference to FIG. 2, with the provision of a power detect/select engine 302 and a charger/selector/battery management unit (BMU) 304 replacing the power detect/select engine 210 and the charger 212. Similarly as discussed above, in an embodiment, the power detect/select engine 302 may include analog circuits to detect and enable a power source. Instructions may be stored on a non-transitory computer-readable medium and, when executed by a processor, may cause the processor to perform the additional functions of the power detect engine discussed below. However, in contrast to the power detect/select engine 210, the power detect/select engine 302 includes an integrated charger in the charger/selector/battery management unit (BMU) 304 that is coupled to the battery 214. The embodiments illustrated in FIGS. 2 and 3 are provided for ease of understanding and described with regard to the method 400, discussed below, using multiple blocks and sequential steps. However, one of skill in the art will recognize that analog circuit alternatives, such as the embodiment illustrated and described with reference to FIG. 5, may be integrated in a single circuit and allow some or all of the steps of the method 400 to be performed simultaneously. In the method 400 discussed below, operation of the power input utilization system will be described with regard to the power input utilization system 200 illustrated in FIG. 2. However, one of skill in the art will recognize how the power input utilization system 300 may perform the steps of the method 400 without departing from the scope of the present disclosure.

Figure 4A:
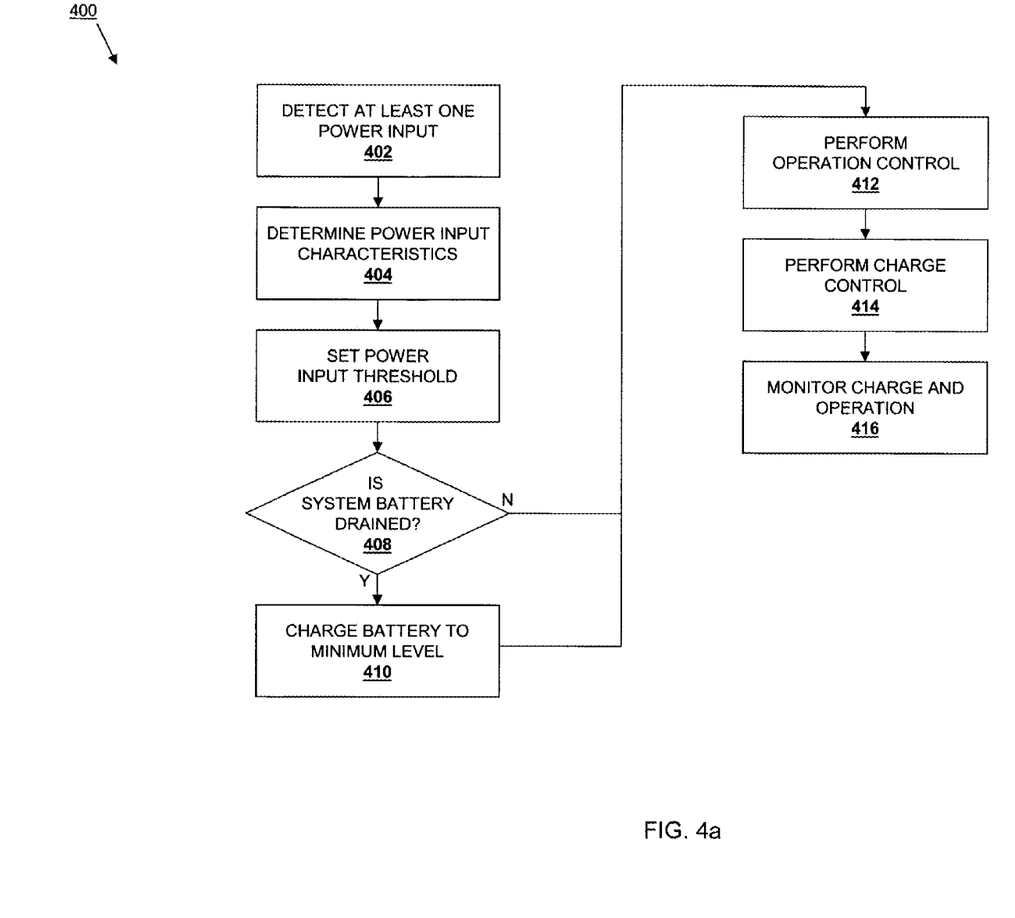
FIG. 4a is a flow chart illustrating an embodiment of a method for power utilization.

Referring now to FIGS. 2 and 4a, a method 400 for power utilization is illustrated. The method 400 begins at block 402 where at least one power input is detected. In an embodiment, one of more of the plurality of power inputs 202 may be coupled to respective power input connectors 206 on the IHS 204, and the power detect/select engine 210 may detect those one or more connections. For example, the dock power input 202a may be connected to the connector 206a, the mobile power input 202b may be connected to the connector 206b, the AC to DC power input 202c may be connected to the connector 206c, the USB power input 202d may be connected to the connector 206d, the wireless power input 202e may be connected to the antenna and converter 206e and, in response, the power detect/select engine 210 will detect the connection or connections. In an embodiment, at block 402 of the method 400, only one power input may be connected to a connector on the IHS 204 to provide a single source of power to the IHS 204. In another embodiment, multiple power inputs may be connected to respective connectors on the IHS 204 to provide multiple sources of power to the IHS 204.

The method 400 then proceeds to block 404 where one or more power input characteristics are determined. In an embodiment, the power detect/select engine 210 may include analog circuits to detect and enable a power source. Instructions may be stored on a non-transitory computer-readable medium and, when executed by a processor, may cause the processor to determine the one or more power input characteristics of the power inputs detected in block 402 of the method 400. For example, one or more of the power inputs detected in block 402 may be "smart" power inputs that, along with power, provide characteristics about the power such as nominal and minimum voltage, maximum current, and/or a variety of other power characteristics known in the art, and the power detect/select engine 210 receives those power input characteristics in block 404 of the method 400. In another example, one or more of the power inputs detected in block 402 may be "dumb" power inputs that simply provide power, and the power detect/select engine 210 may include analog circuits to detect and enable a power source. Instructions may be stored on a non-transitory computer-readable medium and, when executed by a processor, may cause the processor to analyze that power to determine one or more power characteristics such as nominal and minimum voltage, maximum current, and/or a variety of other power characteristics known in the art. In an embodiment, default power characteristics for "dumb" power sources may be stored in a storage and accessed by the processor at block 404. In an embodiment, the power characteristics determined in block 404 may be power characteristics for power provided from a single power input. In another embodiment, the power characteristics determined in block 404 may be power characteristics for a total power provided from a plurality of power inputs (e.g., the power characteristics may be determined for a total power provided from a plurality of different power inputs that each provide a discrete power source for the IHS 204.) In another embodiment, the power characteristics determined in block 404 may be power characteristics for power provided from each of a plurality of power inputs (e.g., power characteristics may be determined for each of a plurality of discrete power sources provided from respective power inputs connected to the IHS 204) in order, for example, to select the highest power and/or the optimal power source for the IHS 204.

The method 400 then proceeds to block 406 where one or more power input thresholds are set. In an embodiment, the power detect/select engine 210 may include analog circuits to detect and enable a power source. Instructions may be stored on a non-transitory computer-readable medium and, when executed by a processor, may cause the processor to use the one or more power input characteristics determined in block 404 to set one or more power thresholds. In an embodiment, the power detect/select engine 210 may include information about the operating states available to the IHS 204 in response to different amounts of power that are available to the IHS 204, and at block 406, the power detect/select engine 210 may use the power input characteristics determined in block 404 to set a power input threshold below which the IHS 204 may not operate properly as a result of lack of power. For example, the power input threshold set in block 406 may include a percentage of the nominal voltage received from the one or more power inputs, a minimal voltage information input from a "smart" power source, and/or a variety of other power input thresholds known in the art.

The method 400 then proceeds to decision block 408 where it is determined whether a system battery is drained. One of skill in the art will recognize that any power input utilization system may be inoperable if the system battery is drained below a minimum charge level, as system components may be inoperable with the system battery below that minimum charge level. Thus, in an embodiment, at decision block 408, the power detect/select engine 210 may check the battery 214 to determine whether the battery 214 has been drained (e.g., that the battery 214 includes a charge that is below a minimum charge level.) If, at decision block 408, the power detect/select engine 210 determines that the battery 214 is drained, the method 400 proceeds to block 410 where the battery is charged to a minimum level. In an embodiment, at block 410, the power detect/select engine 210 provides power received from the one or more power inputs 202 to the charger 212 and allows the charger 212 to charge the battery 214 to a minimum charge level before other IHS operations are initiated.

Figure 4B:
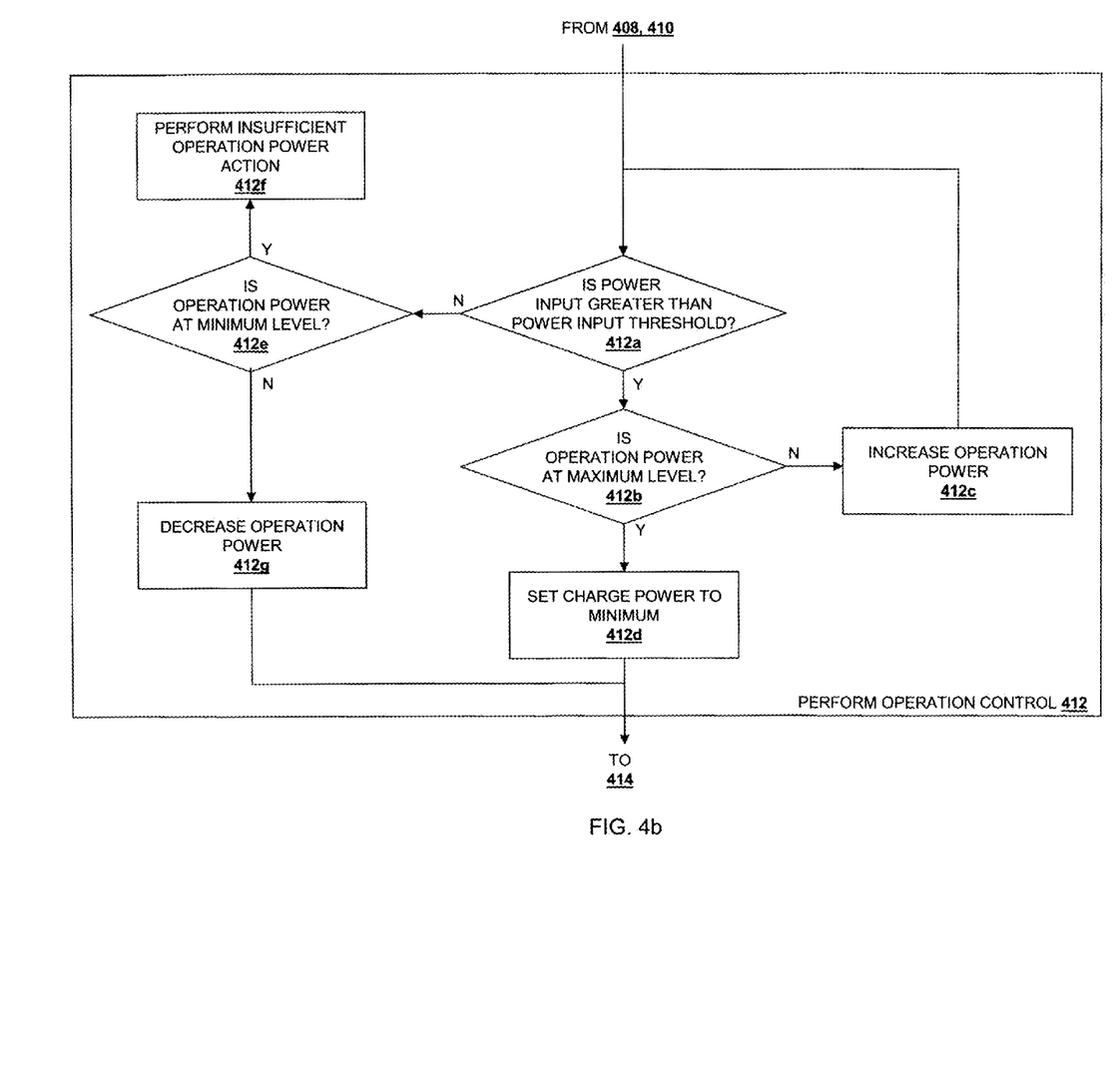

Referring now to FIGS. 4a and 4b, if at decision block 408 it is determined that the system battery is not drained, or following block 410, the method 400 proceeds to block 412 where operation control is performed. At or before block 412, a plurality of operation characteristics may be determined for the plurality of system components 222 in the IHS 204 using the one or more power input characteristics determined in block 404. In an embodiment, the component power control engine 216 includes instructions, stored on a non-transitory computer-readable medium, that when executed by a processor cause the processor to use the one or more power input characteristics determined in block 404 to determine operation characteristics for the plurality of system components 222. In one embodiment, the operation characteristics may be determined for the plurality of system components operating together. In another embodiment, operation characteristics may be determined for each system component 222. In one example, the component power control engine 216 may determined a plurality of operating levels for the plurality of system components 222 that include a minimum operation level, and maximum operation level, and/or a plurality of intermediate operation levels between the minimum operation level and the maximum operation level. In an embodiment, the determination of operating characteristics for current processors such as, for example, those provided by Intel Corporation, may include capping their operating power states (P-states) or disabling a "turbo-mode". Using the information that is implicitly or explicitly provided in response to the selection of the power source as describe herein, one of skill in the art will recognize a variety of ways in which the operation characteristics of the system components 222 may be determined. In an embodiment, the component power control engine 216 includes instructions, stored on a non-transitory computer-readable medium, that when executed by a processor cause the processor, at block 412, to retrieve a plurality of component characteristics from the plurality of system components 222 for use with the one or more power input characteristics to determine the operation characteristics for the plurality of system components 222. For example, the component power control engine 216 may retrieve from the system components 222, or from a database in the IHS 204 (not illustrated), a plurality of component characteristics that include, for example, power consumption for processor operating states, memory technology type (e.g., low power, standard, etc.), storage technology type (e.g., solid state, hard disk drive (HDD), etc.), and/or a variety of other component characteristics known in the art. The component power control engine 216 may then use the component characteristics with the power input characteristics to determine the operation characteristics. For example, the determination of operation characteristics for a particular processor may including limiting the processor to less than peak performance by capping its maximum P-state. Thus, a plurality of operation characteristics for the system components 222 may be determined at block 412 that are based on the power input characteristics determined in block 404 and, in some embodiments, component characteristics of the system components 222.

The method 400 may then perform operation control at block 412, beginning at decision block 412a where it is determined whether a power input is greater than a power input threshold. In an embodiment, the power detect/select engine 210 may include analog circuits to detect and enable a power source. Instructions may be stored on a non-transitory computer-readable medium and, when executed by a processor, may cause the processor to compare the power received from the one or more power inputs 202 to the power input threshold set in block 406 of the method 400 to determine whether the power currently being received by the IHS 204 is above the power input threshold. If, at decision block 412a, the power detect/select engine 210 determines that the power received from the one or more power inputs 202 is greater than the power input threshold, the method 400 proceeds to decision block 412b where it is determined whether operation power has reached a maximum level. In an embodiment, the component power control engine 216 may include analog circuits to detect and enable a power source. Instructions may be stored on a non-transitory computer-readable medium and, when executed by a processor, may cause the processor to determine whether the power provided to the system components 222 has reached a maximum level. For example, in response to the power from the one or more power inputs 202 being above the power input threshold, the component power control engine 216 is operable to cause that power to be supplied to the system components 222. At decision block 412b, the component power control engine 216 may then compare the power being supplied to the system components 222 to the operation characteristics for the system components 222 to determine whether the system components are operating at a maximum operation level included in the operation characteristics.

If, at decision block 412b, it is determined that operation power has not reached a maximum level, the method 400 proceeds to block 412c where the power supplied to the system components (e.g., the "operation power") is allowed to increase. In an embodiment, the component power control engine 216 may include analog circuits to detect and enable a power source. Instructions may be stored on a non-transitory computer-readable medium and, when executed by a processor, may cause the processor to allow the power provided to the system components 222 to increase. For example, at block 412c, the component power control engine 216 may allow an increase in the power used by the system components 222 according to the operation characteristics (e.g., the power supplied may be sufficient to increase the operation of the system components from one intermediate operation level to a higher intermediate operation level). The method 400 then returns to decision block 412a to determine whether the power received from the one or more power inputs is greater than the power input threshold. Thus, decision blocks 412a, 412b and 412c allow the power utilization engine to increase the power provided to the system components 222 until the system components are operating at a maximum operation level wherein the maximum operation level is dependent on the selected power source(s) characteristics. If, at decision block 412b, it is determined that the operation power is at a maximum level, the method 400 proceeds to block 412d where charge power is set to a minimum level. In an embodiment, the power detect/select engine 210 includes instructions, stored on a non-transitory computer-readable medium, that when executed by a processor cause the processor to provide power from the one or more power inputs 202 to the charger 212 and instruct the charger to provide a charge to the battery 214 at a minimum charge level. Thus, once the power provided by the one or more power inputs is sufficient to operate the system components at a maximum level, power from the one or more power inputs is allocated for charging the battery 214.

If, at decision block 412a, it is determined that the power received from the one or more power inputs is below the power input threshold, the method 400 proceeds to decision block 412e where it is determined whether operation power is at a minimum level. In an embodiment, the component power control engine 216 may include analog circuits to detect and enable a power source. Instructions may be stored on a non-transitory computer-readable medium and, when executed by a processor, may cause the processor to determine whether the power provided to the system components 222 is at a minimum level. For example, the component power control engine 216 may compare the power provided from the one or more power inputs 202 to the system components 222 to the operation characteristics of the system components 222 to determine whether that power being provided is not sufficient to operate the components at a minimum operation level. If at decision block 412e, it is determined that the operation power is at a minimum level, the method 400 proceeds to block 412f where an insufficient operation power action is performed. In an embodiment, the power utilization engine may include analog circuits to detect and enable a power source. Instructions may be stored on a non-transitory computer-readable medium and, when executed by a processor, may cause the processor to perform the insufficient operation power action that may include, for example, checking a battery status and shutting down one or more of the system components 222 (e.g., in response to the system component(s) being operated followed by the power received from the one or more power inputs falling below the power input threshold), not turning on one or more system components 222 (e.g., in response to the IHS 204 being connected to a power input that does not provide enough power to properly operate the system component(s)), warning the user and shutting down the system, and/or a variety of other insufficient operation power actions known in the art.

If, at decision block 412e, it is determined that the operation power is not at a minimum level (e.g., the power received from the power inputs 202 is sufficient to power the system components 222), the method 400 proceeds to block 412g where the operation power is decreased. In an embodiment, the component power control engine 216 may include analog circuits to detect and enable a power source. Instructions may be stored on a non-transitory computer-readable medium and, when executed by a processor, may cause the system components 222 to reduce the power consumed from the one or more power inputs 202. Thus, if the power received from the one or more power inputs 202 is below the power input threshold and the system components 222 are still operating above a minimum operation level, the power provided to those system components 222 is decreased. In an embodiment, power may be decreased by capping or otherwise limited a processor P-state to a lower level (e.g., relative to the current P-state of the processor.)

Figure 4C:
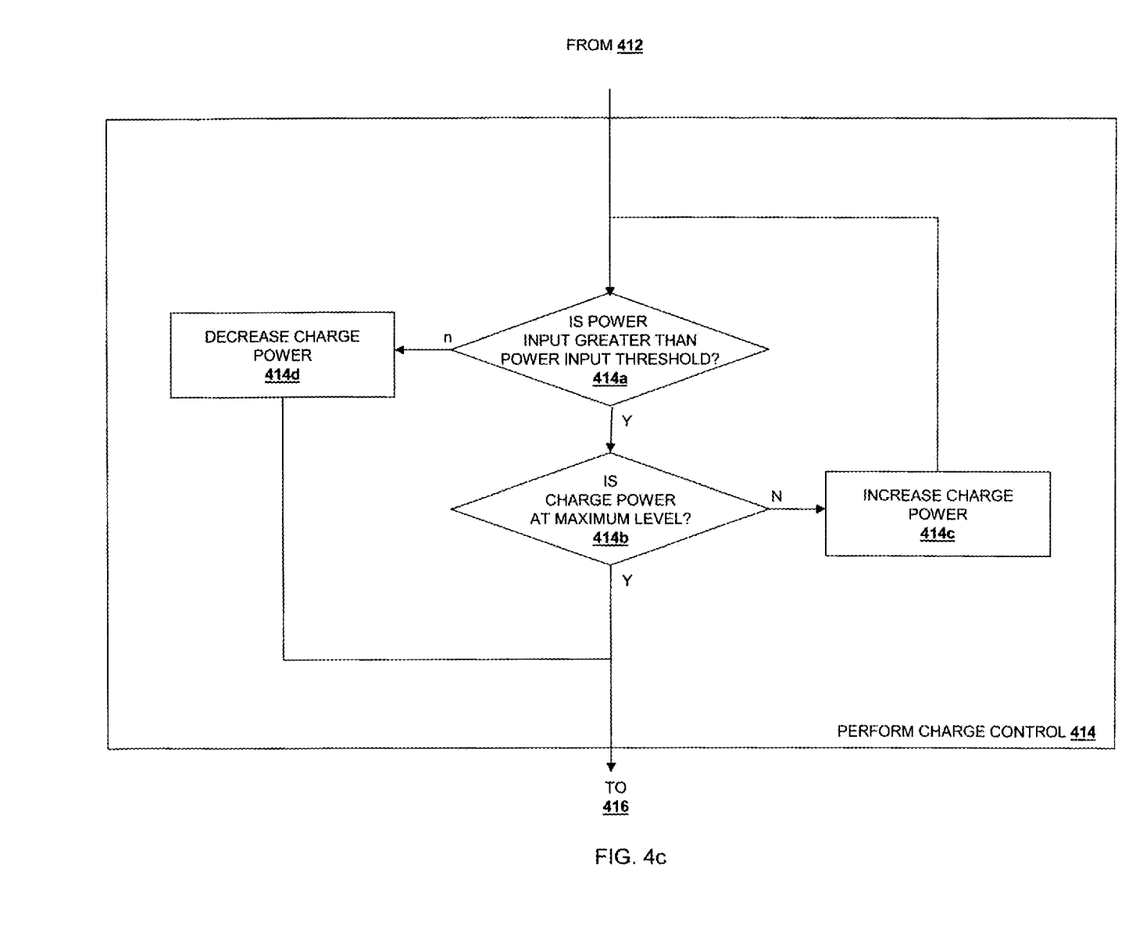

Referring now to FIGS. 4a, 4b, and 4c, following blocks 412d or 412g, the method 400 proceeds to block 414 where a charge control is performed. At block 414, a plurality of charging characteristics may be determined for the battery 214 using the one or more power input characteristics determined in block 404. As used herein, the battery 214 may be considered one of the system components of the IHS 204, and the charging characteristics of the battery 214 may be considered an operation characteristic for the battery 214/system component. In an embodiment, the component power control engine 216 may include analog circuits to detect and enable a power source. Instructions may be stored on a non-transitory computer-readable medium and, when executed by a processor, may cause the processor to use the one or more power input characteristics determined in block 404 to determine charging characteristics for the battery 214. In one example, the component power control engine 216 may determine the battery charge level and select a plurality of charging rates for the battery 214 that include a minimum charge rate, a maximum charge rate, and/or a plurality of intermediate charge rates between the minimum charge rate and the maximum charge rate. The charging process of a battery is complex and may include many factors that can impact battery life, and the power utilization system is operable to consider power source capability, battery charge level, and operation power requirements of system components in determining the charge rate. In an embodiment, the component power control engine 216 may include analog circuits to detect and enable a power source. Instructions may be stored on a non-transitory computer-readable medium and, when executed by a processor, may cause the processor, at block 414, to retrieve a plurality of battery characteristics from the battery 214 for use with the one or more power input characteristics to determine charging characteristics for the battery 214. For example, the component power control engine 216 may retrieve from the battery 214, or from a database in the IHS 204 (not illustrated), a plurality of battery characteristics that include battery type (e.g., lithium ion, lithium polymer, etc.), battery capacity, and/or a variety of battery characteristics known in the art. The component power control engine 216 may then use the battery characteristics with the power input characteristics to determine the charging rates. For example, a charge rate desirable for a given battery may require more power than can be provided by a particular power source under desired operation levels of other system components, while a more capable power source may support the optimum charge rate, and the system allows for the characterizations of those variable in determining the charge rate to be supplied to a battery. Thus, a plurality of charging characteristics for the battery 214 may be determined at block 414 that are based on the power input characteristics determined in block 404 and, in some embodiments, battery characteristics of the battery 214.

The method 400 may then perform charge control at block 414. Beginning at decision block 414a, it is determined whether a power input is greater than a power input threshold. As discussed above, the power detect/select engine 210 is operable to compare the power received from the one or more power inputs 202 to the power input power input threshold set in block 406 to determine whether the power currently being received by the IHS 204 is above the power input threshold. If, at decision block 414a, the power detect/select engine 210 determines that the power received from the one or more power inputs 202 is greater than the power input threshold, the method 400 proceeds to decision block 414b where it is determined whether charge power is at a maximum level. In an embodiment, the component power control engine 216 may include analog circuits to detect and enable a power source. Instructions may be stored on a non-transitory computer-readable medium and, when executed by a processor, may cause the processor to determine whether the charge provided to the battery 214 is at a maximum charge level.

If, at decision block 414b, it is determined that the charge provided to the battery 214 is not at a maximum charge level, the method 400 proceeds to block 414c where the charge provided to the battery 214 (e.g., the "charge power") is increased. In an embodiment, the power detect/select engine 210 may include analog circuits to detect and enable a power source. Instructions may be stored on a non-transitory computer-readable medium and, when executed by a processor, may cause the processor to provide power to the charger 212 and instruct the charger 212 to increase the charge provided to the battery 214. For example, at block 414c, the component power control engine 216 may increase the power provided from the charger 212 to the battery 214 according to the charging characteristics (e.g., the power supplied may be sufficient to increase the charge level from one intermediate charge level to a higher intermediate charge level.) The method 400 then returns to decision block 414a to determine whether the power received from the one or more power inputs is greater than the power input threshold. Thus, blocks 414a, 414b and 414c allow the power utilization engine to increase the charge provided to the battery 214 until the battery is being charged at a maximum charge level. If, at decision block 414a, it is determined that the power received from the one or more power inputs 202 is not greater than the power input threshold, the method 400 proceeds to block 414d where charge power is decreased. In an embodiment, the power detect engine may include analog circuits to detect and enable a power source. Instructions may be stored on a non-transitory computer-readable medium and, when executed by a processor, may cause the processor to decrease the power (from the one or more power inputs) provided to the charger 212 and instruct the charger to decrease a charge provided to the battery 214.

Figure 4D:
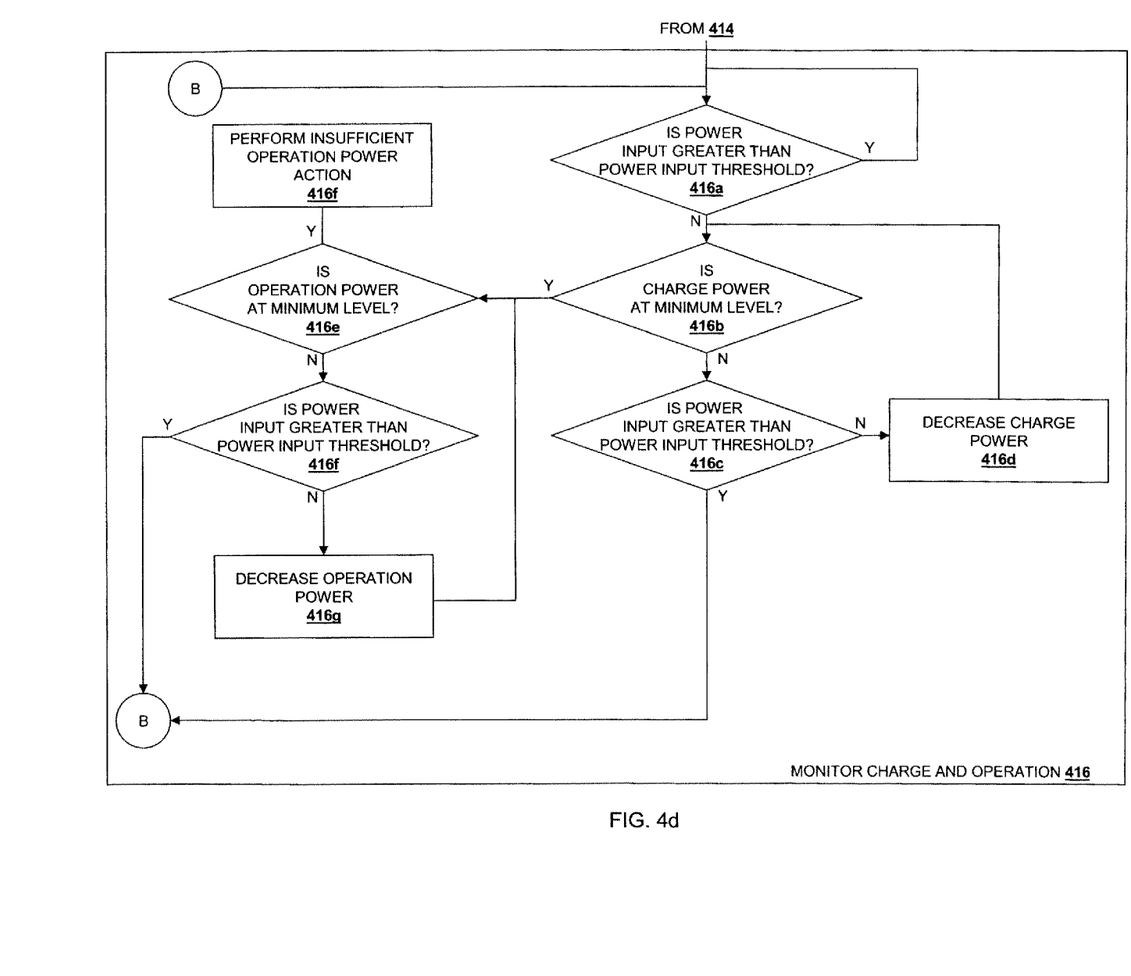

Referring now to FIGS. 4a, 4c, and 4d, following blocks 414b or 414d, the method 400 proceeds to block 416 where charge and operation are monitored. The charge and operation monitoring begins at decision block 416a where it is determined whether a power input is greater than a power input threshold. As discussed above, the power detect/select engine 210 is operable to compare the power received from the one or more power inputs 202 to the power input power input threshold set in block 406 of the method 400 to determine whether the power currently being received by the IHS 204 is above the power input threshold. If, at decision block 416a, the power detect/select engine 210 determines that the power received from the one or more power inputs 202 is greater than the power input threshold, the method 400 returns to decision block 416a and continues to monitor the power received from the one or more power inputs 202 with respect to the power input threshold.

If, at decision block 416a, it is determined the power received from the one or more power inputs 202 is not greater than the power input threshold, the method 400 proceeds to decision block 416*b* where it is determined whether charge power is at a minimum level. In an embodiment, the component power control engine 216 may include analog circuits to detect and enable a power source. Instructions may be stored on a non-transitory computer-readable medium and, when executed by a processor, may cause the processor to determine whether the charge provided to the battery 214 is at a minimum charge level. If, at decision block 416*b*, it is determined that the charge power is not at a minimum level (e.g., the charge provided to the battery 214 is above a minimum charge level), the method 400 proceeds to decision block 416*c* where it is determined whether a power input is greater than a power input threshold. As discussed above, the power detect/select engine 210 is operable to compare the power received from the one or more power inputs 202 to the power input power input threshold set in block 406 of the method 400 to determine whether the power currently being received by the IHS 204 is above the power input threshold. If, at decision block 416*c*, the power detect/select engine 210 determines that the power received from the one or more power inputs 202 is not greater than the power input threshold, the method 400 proceeds to block 416*d* where charge power is decreased. In an embodiment, the power detect engine may include analog circuits to detect and enable a power source. Instructions may be stored on a non-transitory computer-readable medium and, when executed by a processor, may cause the processor to decrease the power provided from the one or more power inputs to the charger 212 and instruct the charger 212 to decrease a charge provided to the battery 214. The method 400 then returns to decision block 416*b*. Thus, blocks 416*b*, 416*c* and 416*d* allow the power utilization engine to decrease the charge provided to the battery 214 until the battery is being charged at a minimum charge level if the power received from the one or more power inputs is not greater than the power input threshold. If, at decision block 416*c*, the power received from the one or more power inputs is greater than the power input threshold, the method 400 returns to decision block 416*a*.

If, at decision block 416*b*, it is determined that the charge power is at a minimum level, the method 400 proceeds to decision block 416*e* where it is determined whether operation power is at a minimum level. If at decision block 416*e*, it is determined that the operation power is at a minimum level, the method 400 proceeds to block 416*f* where an insufficient operation power action is performed. In an embodiment, the power utilization engine may include analog circuits to detect and enable a power source. Instructions may be stored on a non-transitory computer-readable medium and, when executed by a processor, may cause the processor to perform the insufficient power action that may include, for example, shutting down one or more of the system components 222, warning the user and shutting down the system, and/or a variety of other insufficient operation power actions known in the art.

If, at decision block 416*e*, it is determined that the operation power is not at a minimum level, the method 400 proceeds to decision block 416*f* where it is determined whether a power input is greater than a power input threshold. As discussed above, the power detect/select engine 210 is operable to compare the power received from the one or more power inputs 202 to the power input power input threshold set in block 406 of the method 400 to determine whether the power currently being received by the IHS 204 is above the power input threshold. If, at decision block 416*f*, it is determined that the power received from the one or more power inputs 202 is not greater than the power input threshold, the method 400 proceeds to block 416*g* where the operation power is decreased. In an embodiment, the component power control engine 216 may include analog circuits to detect and enable a power source. Instructions may be stored on a non-transitory computer-readable medium and, when executed by a processor, may cause the processor to cause the power provided from the one or more power inputs 202 to the system components to decrease. The method 400 then returns to decision block 416*e*. If, at decision block 416*f*, it is determined that the power received from the one or more power inputs 202 is greater than the power input threshold, the method 400 returns to decision block 416*a*.

Thus, a power utilization system and method have been described that characterize power provided by one or more power inputs, use that power characterization to characterize the operation of a plurality of components, and then operate the components according to the power input and the operation characterization. In an embodiment, the operation characterization may include a charging of a battery. The power utilization system may then monitor the power received from the one or more power inputs and increase the operation of the components (up to a maximum operation level) when the received power is sufficient, decrease the operation of the components (down to the minimum level) when the received power decreases, and stop operation of the components with the received power is insufficient. Furthermore, this component control may include providing a charge to a battery when the other components in the system are operating at a maximum operation level, increasing the charge level to the battery when the received power is sufficient, and decreasing the charge level to the battery when the received power decreases. The power utilization engine allows the use of a plurality of power inputs that may each provide power that has different power characteristics relative to the other power inputs, and that may provide power that varies in amount, quality, etc., thus providing for the variable operation of the components and the charging of the battery based on the power that is actually being provided to the system at any given time.

Figure 5:
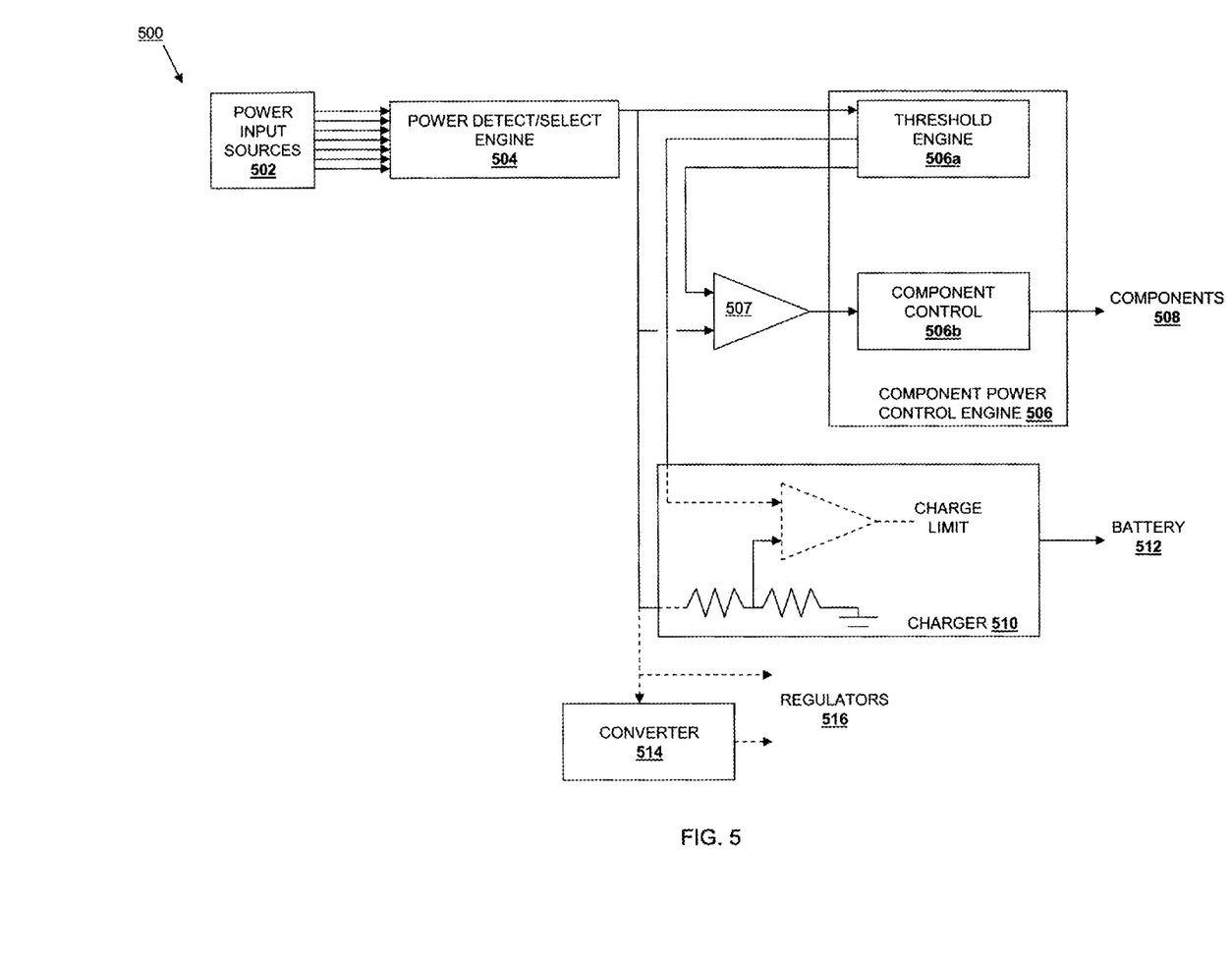
FIG. 5 is a schematic view illustrating an embodiment of an power utilization system.

Referring now to FIG. 5, a power utilization system 500 is illustrated. In an embodiment, the power utilization system 500 is an analog embodiment of a power utilization system that operates according to the method 400 discussed above. The power utilization system 500 includes a plurality of power input sources 502 that may be the power inputs 202*a-e* discussed above. A power detect/select engine 504 is coupled to the power input sources 502. In an embodiment, the power detect/select engine 504 detects active inputs and selects a voltage for operation. For example, the voltages from the power input sources 502 may be passed through a diode, and the highest of those voltages may be used to clamp off the other voltages. In another example, the highest voltage may be used to power selection circuitry that is operable to shut off all of the input power sources but the preferred source. A component power control engine 506 is coupled to the power detect/select engine 504 and includes a threshold engine 506*a* and a component control 506*b*. In an embodiment, the threshold engine 506*a* may regulate the selected input voltage from the power detect/select engine 504 and use it to power a reference generation circuit that provides fixed reference voltages for both battery charging and component operation. For example, a summing circuit may be used that receives a zero for all references from non-active power input sources 502. In an embodiment, the threshold engine 506*a* may incorporate feedback from actual battery charge and component operation power usage. In an embodiment, the component control 506*b* may send an interrupt to the processor (e.g., one of the components 508) to increase or decrease its current performance level. In a relatively simple embodiment, the component control 506b, based on an input from a comparator 507, may use an edge detector and an analog to digital (A-D) converter to change an operation level of the processor. A charger 510 is coupled to the power detect/select engine 504 and the threshold engine 506a, and may be used to detect poor power quality as well as the condition of a battery 512 using charge control circuitry. In an embodiment, the charger 510 may control current limit using the difference in the reference voltage and the supply voltage. In some embodiments, a voltage converter 514 is coupled to regulators 516 and to the power detect/select engine 504.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power input utilization system, comprising:
a plurality of components;
a plurality of power input connectors; and
a power utilization engine that is coupled between the plurality of power input connectors and the plurality of components, wherein the power utilization engine is configured to:
detect a first power input to the plurality of power input connectors;
determine a first power input characteristic for the first power input;
retrieve a plurality of component characteristics about the plurality of components;
determine a plurality of first characteristics for the plurality of components using the first power input characteristic and the plurality of component characteristics;
cause the plurality of components to operate according to the plurality of first operation characteristics using the first power input;
detect a second power input to the plurality of power input connectors that is different than the first power input;
determine a second power input characteristic for the second power input;
determine a plurality of second operation characteristic for the plurality of components using the second power input characteristic and the plurality of component characteristics, wherein at least one of the plurality of second operation characteristics is different from the plurality of first operation characteristics; and
cause the plurality of components to operate according to the plurality of second operation characteristics using the second power input.

2. The system of claim 1, wherein the plurality of components include a battery, and wherein determining the first operation characteristic for the battery includes determining a charging characteristic for the battery using the first power input characteristic.

3. The system of claim 2, wherein the power utilization engine is further configured to:
retrieve a plurality of battery characteristics from the battery, wherein the first charging characteristic for the battery is determined using the first power input characteristics and the plurality of battery characteristics.

4. The system of claim 2, wherein the power utilization engine is further configured to:
determine that the battery has been drained in response to detecting the first power input; and
provide power from the first input to the battery such that the battery includes a minimum charge level.

5. The system of claim 1, wherein the power utilization engine is further configured to:
determine a power input threshold using the first power input.

6. The system of claim 5, wherein the power utilization engine is further configured to:
in response to determining that the first power input is above the power input threshold, cause the plurality of components to increase operation until either the plurality of components reach a maximum operation level or the first power input drops below the power input threshold to the second power input.

7. The system of claim 5, wherein the plurality of components include a battery and the power utilization engine is further configured to:
in response to determining that the first power input is above the power input threshold, cause the battery to increase charging until either the battery reaches a maximum charge level or the first power input drops below the power input threshold to the second input.

8. The system of claim 1, wherein the plurality of component characteristics about the plurality of components include at least one of a power consumption for a processor operating state, a memory technology type, and a storage technology type.

9. An information handling system (IHS), comprising:
a chassis;
a processor located in the chassis;
a battery located in the chassis;
a plurality of power input connectors located on the chassis; and
a power utilization engine located in the chassis and coupled between the plurality of power input connectors and each of the processor and the battery, wherein the power utilization engine is configured to:
detect a first power input to the plurality of power input connectors;
determine a first power input characteristic for the first power input;
retrieve a processor characteristic about the processor;
determine a first operation characteristic for the processor using the processor characteristic and the first power input characteristic;
cause the processor to operate according to the first operation characteristic using the first power input;
determine a first charging characteristic for the battery using the first power input characteristic;
cause the battery to charge according to the first charging characteristic using the power input;
detect a second power input to the plurality of power input connectors that is different than the first power input;
determine a second power input characteristic for second power input;
determine a second operation characteristic for the processor using the processor characteristic and the second power input characteristic, wherein the second operation characteristic is different from the first operation characteristic;
cause the processor to operate according to the second operation characteristic using the second power input;

determine a second charging characteristic for the battery using the second power input characteristic, wherein the second charging characteristic is different than the first charging characteristic; and cause the battery to charge according to the second charging characteristic using the second power input.

10. The IHS of claim 9, wherein the power utilization engine is further configured to:

retrieve a plurality of battery characteristics from the battery, wherein the first charging characteristic for the battery is determined using the first power input characteristics and the plurality of battery characteristics.

11. The IHS of claim 9, wherein the power utilization engine is further configured to:

determine that the battery has been drained in response to detecting the first power input; and provide power from the first power input to the battery such that the battery includes a minimum charge levels.

12. The IHS of claim 9, wherein the power utilization engine is further configured to:

determine a power input threshold using the first power input.

13. The IHS of claim 12, wherein the power utilization engine is further configured to:

in response to determining that the first power input is above the power input threshold, cause the processor to increase operation until either the processor reaches a maximum operation level or the first power input drops below the power input threshold to the second input.

14. The IHS of claim 12, wherein power utilization engine is further configured to:

in response to determining that the first power input is above the power input threshold, cause the battery to increase charging until either the battery reaches a maximum charge level or the first power input drops below the power input threshold to the second power input.

15. The IHS of claim 9, wherein the processor characteristic about the processor includes a power consumption for a processor operating state.

16. A method for power utilization, comprising:

detecting a first power input to a plurality of power input connectors;

determining a first power input characteristic for the first power input;

retrieving a plurality of component characteristics about a plurality of components;

determining a plurality of first operation characteristics for the plurality of components using the plurality of component characteristics and the first power input characteristic;

causing the plurality of components to operate according the plurality of first operation characteristics using the first power input;

detecting a second power input to a plurality of power input connectors that is different than the first power input;

determining a second power input characteristic for the second power input;

determining a plurality of second operation characteristics for the plurality of components using the plurality of component characteristics and the second power input characteristic, wherein at least one of the plurality of second operation characteristics is different from the plurality of first operation characteristics; and causing the plurality of components to operate according to the plurality of second operation characteristics using the second power input.

17. The method of claim 16, wherein the plurality of components include a battery and the method further comprises:

determining that the battery has been drained; and providing power from the first power input to the battery such that the battery includes a minimum charge level.

18. The method of claim 16, further comprising:

determining a power input threshold using the first power input.

19. The method of claim 18, further comprising:

in response to determining that the first power input is above the power input threshold, cause the plurality of components to increase operation until either the plurality of components reach a maximum operation level or the first power input drops below the power input threshold to the second power input.

20. The method of claim 18, wherein the plurality of components include a battery and the method further comprises:

in response to determining that the first power input is above the power input threshold, cause the battery to increase charging until either the battery reaches a maximum charge level or the first power input drops below the power input threshold to the second input.

* * * * *